United States Patent
Rangarajan et al.

(10) Patent No.: US 8,103,862 B2
(45) Date of Patent: Jan. 24, 2012

(54) SELF TEST INITIALIZATION

(75) Inventors: Madhusudhan Rangarajan, Round Rock, TX (US); Robert Volentine, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 850 days.

(21) Appl. No.: 12/145,691

(22) Filed: Jun. 25, 2008

(65) Prior Publication Data

US 2009/0327681 A1    Dec. 31, 2009

(51) Int. Cl.
*G06F 15/177*    (2006.01)

(52) U.S. Cl. .................. 713/1; 713/2; 713/100

(58) Field of Classification Search ............. 713/1, 2, 713/100
See application file for complete search history.

(56) References Cited

U.S. PATENT DOCUMENTS

| | | | |
|---|---|---|---|
| 5,809,531 A | 9/1998 | Brabandt | |
| 6,704,840 B2 * | 3/2004 | Nalawadi et al. | 711/118 |
| 6,839,277 B2 * | 1/2005 | Nguyen et al. | 365/185.04 |
| 7,127,579 B2 * | 10/2006 | Zimmer et al. | 711/163 |
| 7,254,676 B2 | 8/2007 | Datta et al. | |
| 7,308,576 B2 * | 12/2007 | Glew et al. | 713/170 |
| 7,469,335 B2 * | 12/2008 | Chu et al. | 713/2 |
| 7,493,460 B2 * | 2/2009 | Zimmer et al. | 711/166 |
| 7,676,631 B2 * | 3/2010 | Kamiko et al. | 711/126 |
| 7,882,341 B2 * | 2/2011 | Rothman et al. | 713/1 |
| 2004/0103272 A1 | 5/2004 | Zimmer et al. | |
| 2004/0255197 A1 * | 12/2004 | Schelling | 714/36 |
| 2007/0061558 A1 * | 3/2007 | Rothman et al. | 713/1 |
| 2008/0005549 A1 * | 1/2008 | Ke | 713/1 |
| 2009/0271601 A1 * | 10/2009 | Zimmer et al. | 713/2 |
| 2009/0287900 A1 * | 11/2009 | Kirscht et al. | 711/173 |

OTHER PUBLICATIONS

Eswaramoorthi Nallusamy; A Framework for Using Processor Cache As RAM (CAR); Oct. 10, 2005; pp. 1-25; University of New Mexico; http://www.coreboot.org/images/6/6c/LBCar.pdf.

* cited by examiner

*Primary Examiner* — M Elamin
(74) *Attorney, Agent, or Firm* — Haynes and Boone, LLP

(57) ABSTRACT

A system to perform an information handling system (IHS) initialization includes one or more subsystems to receive a command to power on the IHS, initialize a processor cache memory to emulate a random access memory (RAM), determine whether a manufacturing self test is being performed on the IHS, and in response to the manufacturing self test being performed, complete the initialization without a complete memory initialization.

18 Claims, 2 Drawing Sheets

SELF TEST INITIALIZATION

BACKGROUND

The present disclosure relates generally to information handling systems, and more particularly to a self test initialization for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs use a system to speed up early basic input/output system (BIOS) power-on self test (POST) and provide a data stack for BIOS code prior to main memory initialization. This system is referred to as cache as RAM (CAR). BIOS, POST, and RAM (random access memory) are all commonly used in the IHS industry and should be readily understood by a person having ordinary skill in the art. CAR makes use of the processor's cache memory as a temporary RAM.

In common usages CAR is used to provide a temporary RAM data area used to setup a call stack, data segment and to cache the early BIOS code being executed. All of this occurs prior to memory initialization. After memory initialization, system memory is used to provide all of these RAM data areas and BIOS POST code will be executed using the system main memory. A problem with this system is that BIOS POST on IHSs and especially server IHSs is time consuming and takes several minutes or more to complete depending upon total memory population in the system. The more memory an IHS has the longer it takes to initialize the memory (e.g., dynamic random access memory (DRAM)) array thus, resulting in increased boot times.

In an IHS manufacturing facility, where all systems are run through a self test process called Quick Test (QT). A lengthy POST time to complete a self test is inefficient. It not only slows down production time and total throughput, but also incurs additional labor costs to operate the self testing equipment. With large volumes of IHSs requiring self tests, these combined inefficiencies are very costly. Additionally, these long BIOS POST execution times that increase in proportion to the amount of installed memory are totally unnecessary for QT.

Accordingly, it would be desirable to provide a self test initialization process absent the disadvantages discussed above.

SUMMARY

According to one embodiment, a system to perform an information handling system (IHS) initialization includes one or more subsystems to receive a command to power on the IHS, initialize a processor cache memory to emulate a random access memory (RAM), determine whether a manufacturing self test is being performed on the IHS, and in response to the manufacturing self test being performed, complete the BIOS POST initialization without a complete memory initialization.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
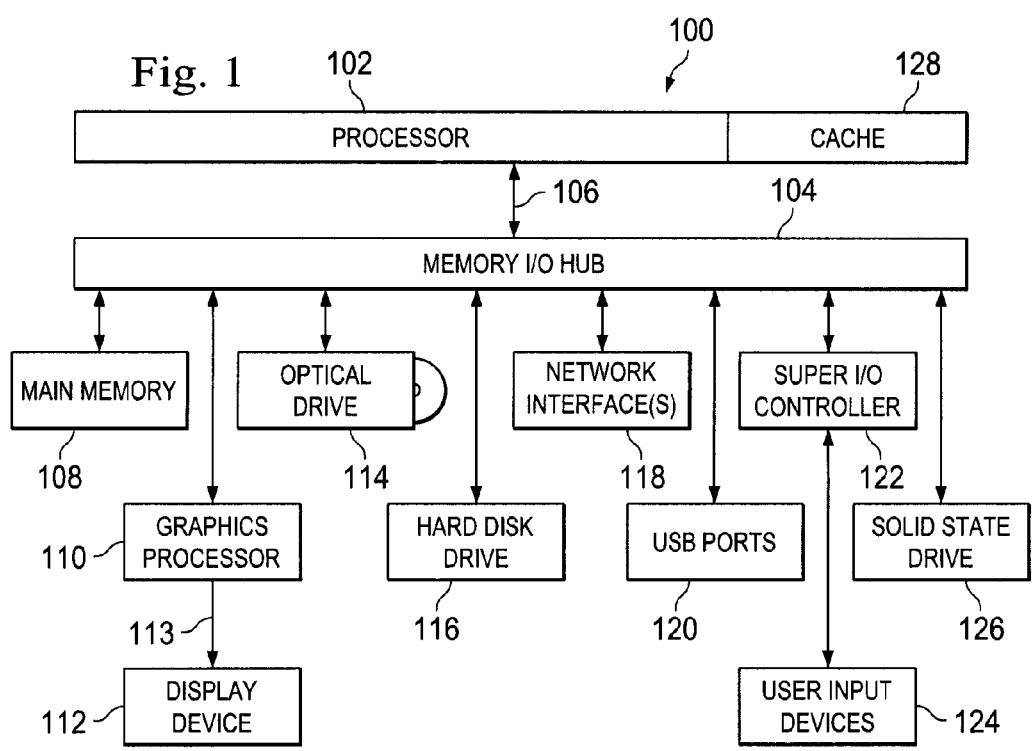
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

The processor 102 also includes a cache memory 128. The cache memory 128 is generally known in the art as a temporary storage area where frequently accessed data may be stored for rapid access by the processor 102. Once the data is stored in the cache memory 128, future use of the data may be made by accessing the cached copy of the data rather than re-acquiring the original data from the main memory 108 and/or one of the drives 114, 116, 126, Thus, the average access time is generally shorter using the cache memory 128 than the main memory 108. The cache memory 128 therefore, helps expedite data access that the processor 102 would otherwise need to retrieve from main memory 108. The cache memory 128 is traditionally smaller than the main memory 108 and may be used to store the data that is most frequently used by the processor. Processors 102 are being designed with larger and larger cache memory 128 sizes. Some cache memories 128 utilize multi-level caches (e.g., level 1 (L1), level 2 (L2), level 3 (L3) and the like). For example, some processors 102 may have a 4 MB L2 cache or a 16 MB L3 cache. However, any number of levels and any size of cache memory 128 may be used.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

In an embodiment, the present disclosure utilizes cache memory 128 as RAM (e.g., main memory 108) (CAR) to significantly reduce the amount of time spent in a factory Quick Test (QT) by reducing BIOS boot time from several minutes to only a few seconds. In an embodiment, this system utilizes the processor's cache memory 128 to act as a temporary RAM. For processors employing large cache memories 128 (e.g., 4 MB, 8 MB, 16 MB or larger), enough CAR memory should be available to provide the RAM resources required during BIOS POST execution to boot the system.

Figure 2:
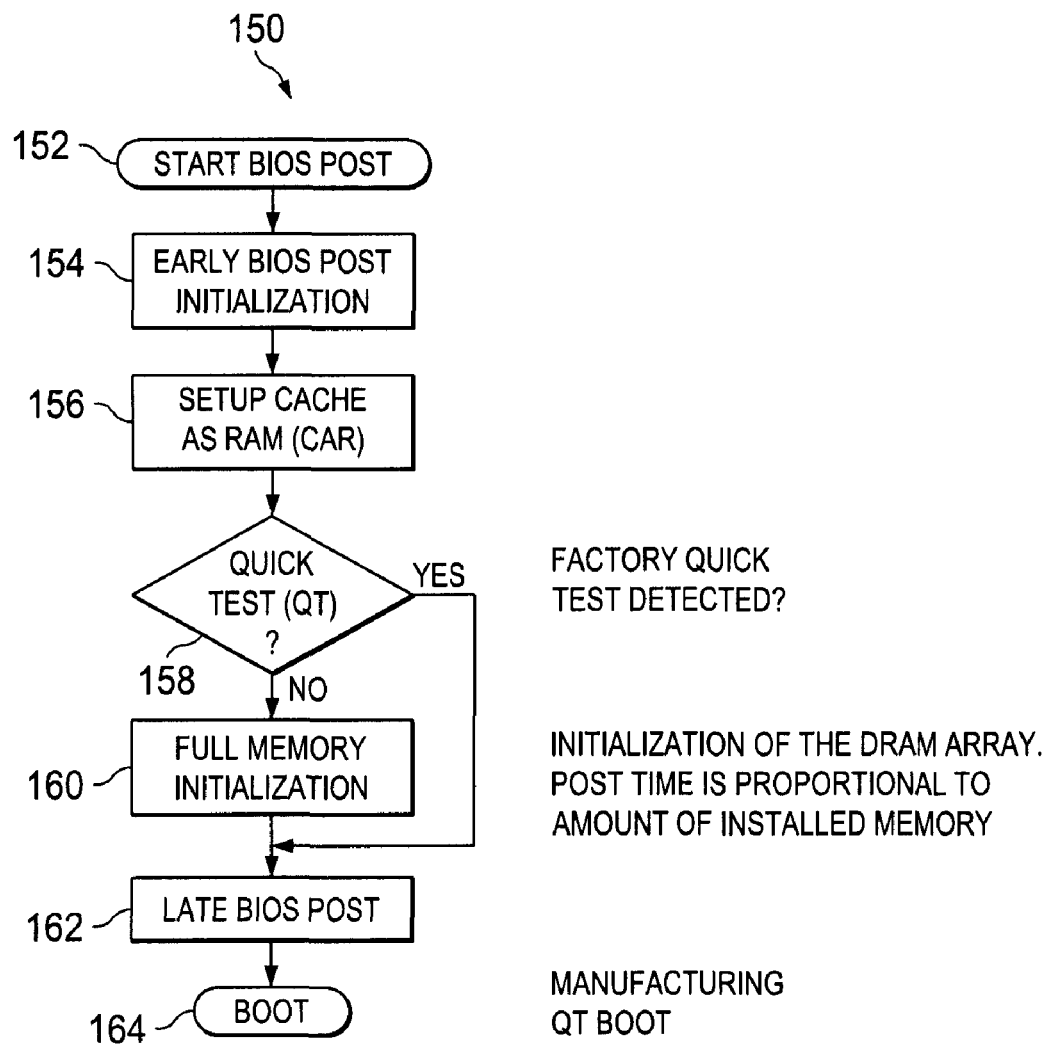
FIG. 2 illustrates a flowchart of an embodiment of a method for a BIOS initialization during a test of the IHS of FIG. 1.

FIG. 2 illustrates a flowchart of an embodiment of a method 150 for a BIOS test of the IHS 100 of FIG. 1. The method 150 starts at 152 where the IHS 100 has received a power-on command (e.g., a user presses the on button) and the basic input/output system (BIOS) begins a power on self-test (POST) to initialize the IHS 100. In an embodiment, when the IHS 100 is powered on, BIOS code execution starts at the reset vector. As is commonly known in the art, a reset vector is generally used to describe a default location that a processor 102 will go to find the first instruction that it will execute after a reset. In other words, the reset vector is a pointer or address where the processor 102 should begin as soon as it is able to execute instructions.

The method 150 then proceeds to block 154 where the early POST initialization is performed by the BIOS on the IHS 100. In early POST, BIOS completes some basic configuration of the processor 102 and other IHS 100 components (e.g., the I/O hub 104, the graphics processor 110, the super I/O controller 122, and/or a variety of other components). It should be readily understood by a person having ordinary skill in the art that complete or incomplete configuration of the IHS 100 components occurs in block 154.

Next, the method 150 proceeds to block 156 where the method 150 sets up the cache memory 128 as RAM. Some or all of the cache memory 128 may be set up as RAM. Using the cache memory 128 as RAM allows the cache memory 128 to be used by the BIOS, an IHS 100 operating system and/or a variety of other applications as if the application is using the main memory 108. However, the cache memory 128 may be used for storage and retrieval of data before the main memory 108 is fully initialized. Thus, when the cache memory 128 is initialized as RAM (CAR), the BIOS may set up the processor cache memory 128 to function as RAM storage. The use of the cache memory 128 as RAM may be temporary or permanent. Using CAR for a self test as shown in this disclosure, may require that more cache memory 128 be initialized as RAM than for a regular CAR start-up.

The method 150 proceeds next to decision block 158 where the method 150 determines whether a self-test is being performed on the IHS 100. The method 150 may detect if a self-test is being performed on the IHS 100 by determining what commands are being performed by the processor 102. Thus, if the processor 102 is being commanded to perform certain tasks only used on self tests (e.g., a first start-up at the manufacturing facility of the IHS), the method 150 would determine that the IHS 100 is under a self test. Also, the method 150 may determine that a self-test is being performed on the IHS 100 given that this is the first start up for the IHS 100. As should be readily understood by a person having ordinary skill in the art, any system or method may be used by the method 150 to determine whether a self-test is being performed on the IHS 100.

In an embodiment, a check is made to determine if IHS is booting during a manufacturing quick test (QT) (e.g., a manufacturer's test of functionality of the IHS 100). Initializing the cache memory 128 as RAM and using this temporary RAM to complete the BIOS boot process (e.g., without initializing the main memory 108) for QT results in a significantly shorter boot time for the IHS 100. Thus, when a manufacturer of the IHS is able to perform functionality testing of the IHS without waiting for all of the main memory 108 to initialize, time for manufacturing functionality testing of the IHSs 100 is reduced allowing more IHSs 100 to be tested in less time.

If the answer in decision block 158 is yes, a self-test is being performed on the IHS 100, the method 150 proceeds to block 162 where a late BIOS POST is performed by the IHS 100. In block 162 Bios continues system initialization during late POST. In an embodiment, this phase of the BIOS boot process may require initialized main memory 108. Using the method 150, block 162 may be completed using cache as RAM (CAR), as should be readily understood by a person having ordinary skill in the art.

On the other hand, if the answer in decision block 158 is no, a self-test is not being performed on the IHS 100, the method 150 proceeds to block 160 where a full initialization of the main memory 108 is performed. In an embodiment, all main memory 108 is initialized by the BIOS. As such, this may require setting up the memory controller in the chipset (the memory I/O hub 104 and/or a variety of other components). The more main memory 108 installed on the IHS 100, the longer this process takes. An embodiment of a main memory is a dual in-line memory module (DIMM), however, any type of memory device may be used for the main memory 108. It is noted that the method 150 may not perform block 160 (e.g., main memory 108 initialization) during a self test, such as, a manufacturer's factory QT boot.

The method 150 then proceeds to block 162 where a late BIOS POST is performed by the IHS 100. Then, the method 150 ends at block 164 where the IHS 100 continues a boot process. In an embodiment, block 164 provides that a BIOS POST is completed and the IHS 100 boots to an available boot device to perform the factory QT. It should be understood that a QT may perform any variety of tests on the IHS 100.

Using the systems and methods of the present disclosure, CAR may be used to significantly reduce POST time in QT. Therefore, POST execution time can be reduced to only a few seconds for a QT. In the factory production process, this translates into a cost savings.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system to perform an information handling system (IHS) initialization, the system comprising one or more subsystems to:
    receive a command to power on an IHS that includes a processor and a system memory coupled to the processor;
    initialize a cache memory of the processor to emulate a random access memory (RAM);
    determine whether a manufacturing self test is being performed on the IHS; and
    in response to determining the manufacturing self test is being performed, complete the IHS initialization using the cache memory and without initializing any of the system memory.

2. The system to perform an IHS initialization of claim 1, wherein the initialization is performed by a basic input/output system (BIOS).

3. The system to perform an IHS initialization of claim 1, wherein the initialization includes a power on self test (POST).

4. The system to perform an IHS initialization of claim 1, wherein the manufacturing self test is performed during a manufacturing process by a manufacturer of the IHS.

5. The system to perform an IHS initialization of claim 1, wherein the cache memory of the processor is temporarily used to provide a plurality of RAM resources required during a BIOS POST execution to boot the IHS.

6. The system to perform an IHS initialization of claim 1, further comprising one or more subsystems to:
    boot-up the IHS using the cache memory of the processor as the system memory.

7. An information handling system (IHS), comprising:
    a processor including a cache memory;
    a main memory coupled to the processor; and
    a system to perform initialization of the IHS, comprising one or more subsystems to:
        receive a command to power on the IHS;
        initialize the cache memory to emulate a random access memory (RAM); and
        determine whether a manufacturing self test is being performed on the IHS;
        wherein in response to determining that the manufacturing self-test is being performed:
            a late basic input/output system (BIOS) power-on self test (POST) is performed using the cache memory and without initializing any of the main memory; and
        wherein in response to determining the self-test is not being performed:
            initialization of the main memory is performed.

8. The IHS of claim 7, wherein the manufacturing self test is performed during a manufacturing process by a manufacturer of the IHS.

9. The IHS of claim 7, wherein the cache memory is temporarily used to provide a plurality of RAM resources required during the BIOS POST test to boot the IHS.

10. The IHS of claim 7, further comprising one or more subsystems to:
    boot-up the IHS using the cache memory as the main memory.

11. A method to perform an information handling system (IHS) initialization, comprising:
    receiving a command to power on an IHS that includes a processor and a system memory coupled to the processor;
    initializing a cache memory of the processor to emulate a random access memory (RAM);
    determining whether a manufacturing self test is being performed on the IHS; and
    in response to determining the manufacturing self test is being performed, completing the IHS initialization using the cache memory and without completely initializing the system memory subsequent to the booting of the IHS.

12. The method of claim 11, wherein the initialization is performed by a basic input/output system (BIOS).

13. The method of claim 11, wherein the initialization includes a power on self test (POST).

14. The method of claim 11, wherein the manufacturing self test is performed during a manufacturing process by a manufacturer of the IHS.

15. The method of claim 11 wherein the cache memory is temporarily used to provide a plurality of RAM resources required during a BIOS POST execution to boot the IHS.

16. The method of claim 11, further comprising:
    booting-up the IHS using the cache memory as the system memory.

17. A method to factory test an information handling system (IHS) comprising:
    assembling an IHS including a processor and a system memory coupled to the processor;
    powering on the IHS;
    performing a power on self-test (POST) using a basic input/output system (BIOS) to initialize a cache memory of the processor to emulate a random access memory (RAM); and
    determining whether a manufacturing self test is being performed on the IHS;
    wherein in response to determining the manufacturing self-test is being performed, a late BIOS POST is performed using the cache memory and without completely initializing the system memory subsequent to the booting of the IHS; and
    wherein in response to determining the self test is not being performed, a main memory full initialization is performed.

18. The method of claim 17, wherein determination of whether a manufacturing self test is being performed on the IHS occurs during a first power-up of the IHS.

* * * * *